United States Patent [19]
Yoshigai

[11] Patent Number: 5,082,092
[45] Date of Patent: Jan. 21, 1992

[54] CYCLE BRAKE

[75] Inventor: Kenichi Yoshigai, Osaka, Japan

[73] Assignee: Yoshigai Kikai Kinzoku Co. Ltd., Osaka, Japan

[21] Appl. No.: 512,181

[22] Filed: Apr. 20, 1990

[51] Int. Cl.$^5$ .............................................. B62L 1/14
[52] U.S. Cl. .................................. 188/24.21; 188/216
[58] Field of Search .............. 188/24.12, 24.21, 72.3, 188/72.9, 216

[56] References Cited

U.S. PATENT DOCUMENTS

| 4,597,474 | 7/1986 | Nagano | 188/72.3 X |
|---|---|---|---|
| 4,754,853 | 7/1988 | Nagano | 188/24.19 |
| 4,768,623 | 9/1988 | Nagano | 188/24.12 |
| 4,787,485 | 11/1988 | Hosokawa | 188/72.3 X |
| 4,793,444 | 12/1988 | Nagano | 188/72.3 X |
| 4,838,386 | 6/1989 | Yoshigai | 188/24.12 |
| 4,838,387 | 6/1989 | Yoshigai | 188/24.21 |

FOREIGN PATENT DOCUMENTS

| 453290 | 2/1951 | Italy | 188/24.21 |
|---|---|---|---|
| 63-992 | 1/1988 | Japan. | |
| 63-193127 | 12/1988 | Japan. | |

Primary Examiner—George E. A. Halvosa
Attorney, Agent, or Firm—Sixbey, Friedman, Leedom & Ferguson

[57] ABSTRACT

It consists of a pair of brake arms provided with brake shoes, the distance between which can be freely widened or narrowed, arm mounting plates provided with support shafts to support brake arms and attached to a bicycle body, return springs which energize brake arms constantly in spreading directions so as that aforementioned brake shoes are separated apart from each other, and spring caps and tightening bolts.

A return spring storage recess is formed around the support shaft and in the bossed section of the aforementioned brake arm, within said recess is stored the return spring fitted onto the support shaft; while one end of the return spring is engaged onto the bossed section of each arm, the other end is engaged onto the spring cap which is directly or indirectly connected to the support shaft; and a rotating tool seat is provided at the periphery of the spring cap at least on one arm for the purpose of spring tension adjustment.

1 Claim; 2 Drawing Sheets

CYCLE BRAKE

FIELD OF THE INVENTION AND RELATED ART STATEMENT

The present invention relates to a cycle brake such as a cantilever brake and a center pull type caliper brake.

Conventionally known as this type of brake is a cantilever brake illustrated at FIG. 5. This is a brake wherein brake arms 24, 25 of cantilever type are mounted by means of attachment bolts 26 onto support shafts 23 of a pair of mounting plates 22 which are fixed to a cycle body, particularly to a front fork 21, so as that said brake arms are respectively and freely rotatable around said support shafts 23; wherein built in at bossed sections 29 are return springs (not illustrated) which constantly add contra-rotary force onto said brake arms 24, 25, so as that brake shoes 27 attached to the middle part of brake arms 24, 25 and positioned to face each other are separated from a rim 28; and wherein at the upper end of each of the brake arms 24, 25 is connected a lifting wire 30, which can bring the brake shoes 27 into contact with the rim 28 by rotating said arms 24, 25 contrary to the spring force of the return spring.

Known as a means of adjustment of the energizing power or the tension of the aforementioned return spring are, for example, a case wherein one end of the return spring stored in the bossed section 29 on at least one of the brake arms 24, 25 is engaged onto an adjustment ring stored within the bossed section 29 and a member at said bossed section 29 is provided to rotate said adjustment ring from outside (e.g. Publication of Unexamined Utility Model Applications, SHO 63 (1988)-992), and a case wherein another end of the return spring is engaged onto an adjustment metal fitted to a support shaft 2 and said adjustment metal is indirectly fixed to the support shaft via ratchet pawls and ratchets which are pressed by the spring (e.g. Publication of Unexamined Utility Model Application SHO 63 (1988)-193127).

However, the problem with the return spring tension adjustment in the above conventional brake was in the complicated structure, numerous parts and high cost as well as difficulty in assembly.

OBJECTS AND SUMMARY OF THE INVENTION

The present invention aims at providing a cycle brake of a simple structure for easy assembly, which possesses an adjustment means for return spring force comprising a less number of parts and availability at a lower cost.

The present invention, in order to achieve the above objective, adopted the following technical means.

In a cycle brake comprising a pair of brake arms 4 each provided with a brake shoe, the distance between said brake arms being freely broadened or narrowed, an arm mounting plate 1 provided with a support shaft 2 which supports the brake arm 4 and can be attached to a cycle body, a return spring 12 which constantly energizes the pair of brake arms 4 in spreading directions so as to separate the aforementioned pair of brake shoes 6 from each other, and spring cap 9 and a fastening bolt 16, the present invention is characteristic in that inside the bossed part of at least one of aforementioned brake arms 4 is formed a return spring storage recess 11 around the support shaft 2, that inside said recess 11 is stored a return spring 12 fitted onto the support shaft 2, that one edge 12A of said return spring 12 is engaged onto the bossed part 5 of each of the arms 4 while the other edge 12B is engaged onto the spring cap 9 which is directly or indirectly connected to the support shaft 2, and that at the periphery of the spring cap 9 on at least one arm is provided a rotating tool seat 19 to adjust the spring tension.

According to the present invention, when the brake is operated, the brake arm 4 in a pair will rotate around the support shaft 2 and the brake shoe 6 in a pair is pressed against both sides of a wheel rim creating braking force. At this time the return spring 12 is made to work by the brake arm 4, 4 in a tightening direction, while both ends 12A, 12B of the return spring 12 remain engaged in position generating no frictional resistances, which renders the braking operation to be light and free of creaks. Further, being stored within the bossed section 5 of the brake arm and covered with the spring cap 9, the return spring 12 can avoid soiling by mud or rusting, acquire equal tension on both sides, and create no pulling but well balanced braking force.

The return spring 12 can be tightened or loosened by a turn of the spring cap 9 after slight loosening of the attachment bolt 16. When the tension is changed to a desired level, the attachment bolt 16 will be tightened up and thus the tension on both brake arms 4, 4 can be easily adjusted.

The cycle brake in the present invention, as described above, consists of the return spring storage recess 11 formed around the support shaft 2 and inside the bossed section 5 of the arm 4 in a pair, the return spring 12 being stored within said recess 11 and fitted on to the support shaft 2, one end 12A of said return spring 12 being engaged onto the bossed section 5 of each arm 4 while the other end 12B being engaged onto the spring cap which is directly or indirectly connected to the support shaft 2, and the rotating tool seat 19 provided for purposes of spring tension adjustment at the periphery of the spring cap at least on one side, and thus it has a simple structure for easy assembly, less number of parts for ease of parts management and reduced cost, facilitates for easy adjustment of spring tension whereby the degree of adjustment can be visually ascertained from outside, and can give a clear-cut appearance.

DESCRIPTION OF THE PREFERRED EMBODIMENT

Described below are the embodiments of the present invention based on drawings.

Figure 1:
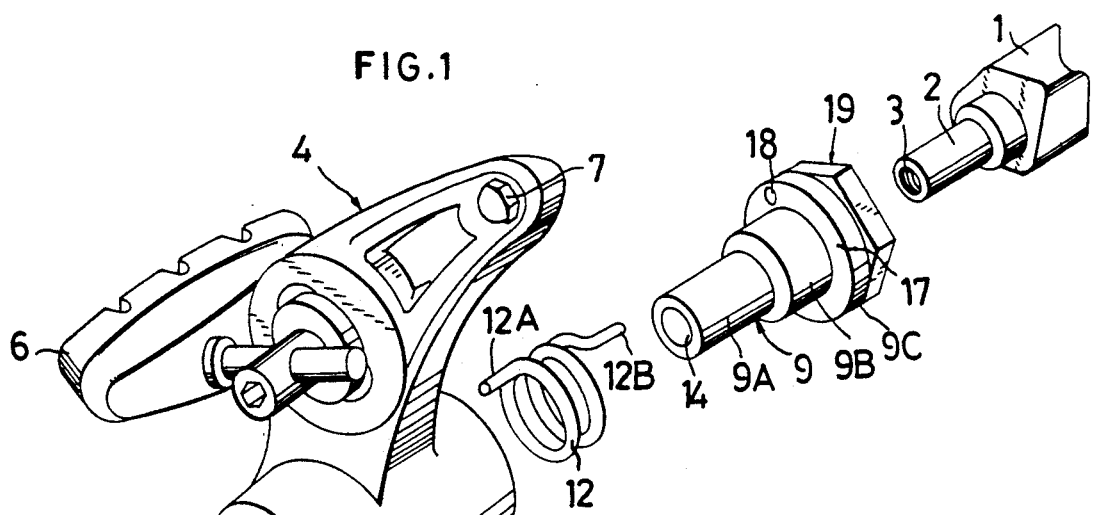
FIGS. 1 and 2 illustrate the first embodiment of the present invention with an exploded perspective drawing and a sectional drawing along the center of the support shaft.
Figure 3:
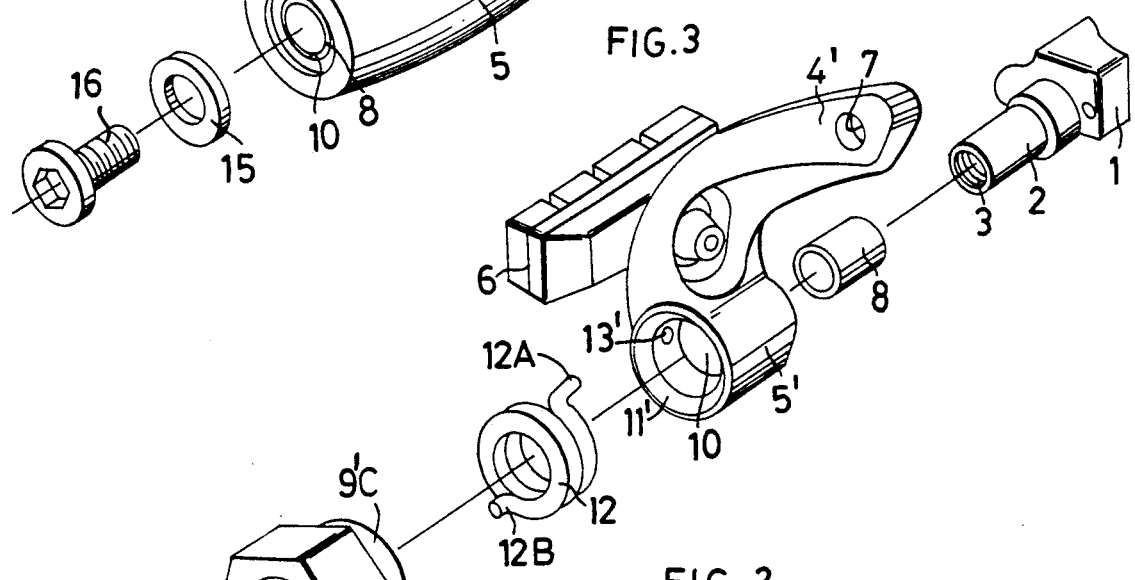
FIG. 3 and 4 illustrate the second embodiment of the present invention with an exploded perspective drawing and a sectional drawing along the center of the support shaft.
Figure 2:
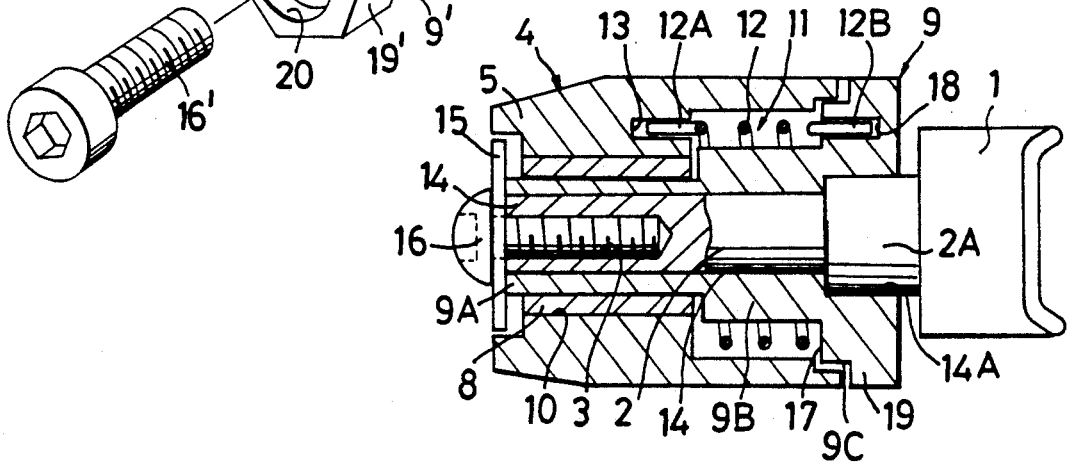
Figure 4:
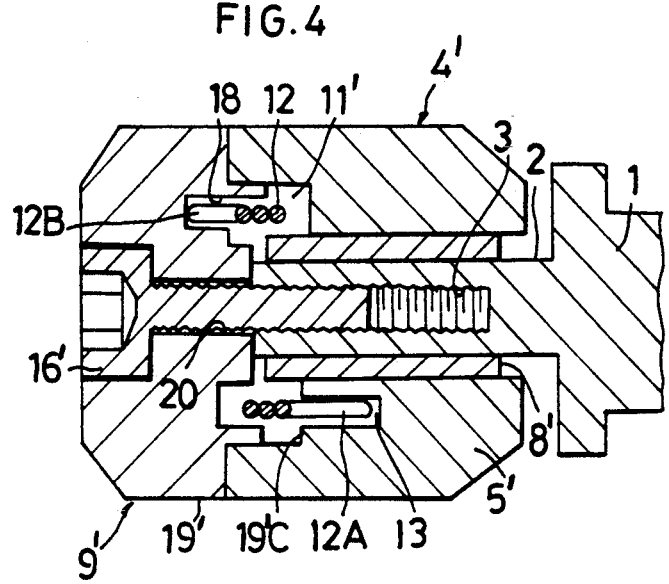
Figure 5:
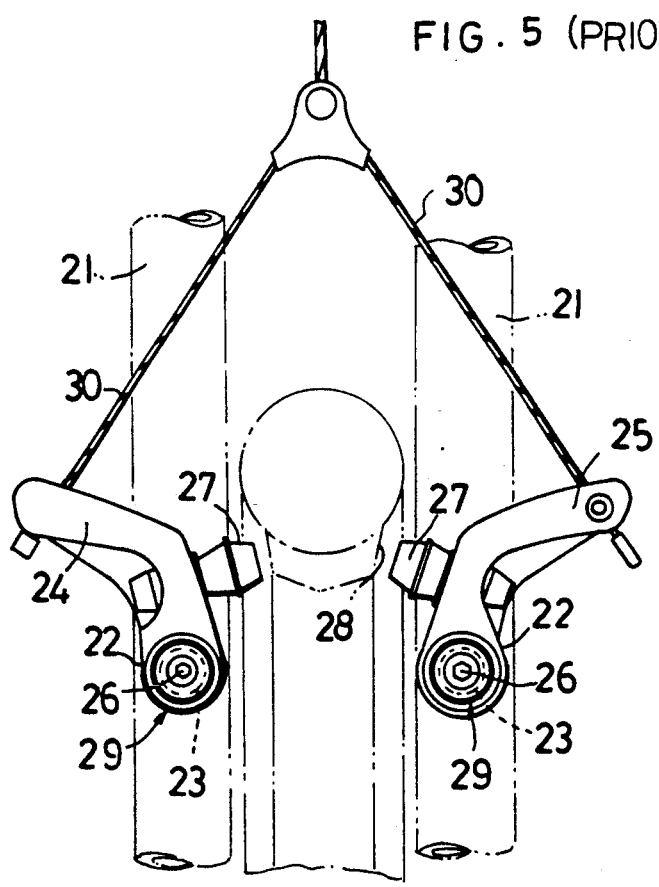
FIG. 5 is a front view of a conventional cantilever brake.

FIGS. 1 through 4 illustrate applications of the present invention in a cantilever brake, FIGS. 1 and 2 being the first embodiment and FIGS. 3 and 4 being the second embodiment. While these figures are the exploded perspective drawings and sectional drawings along the center of the support shaft for the right brake arm, the left brake arm has the same structure except for the reverse direction of the return spring winding.

In FIGS. 1 and 2, 1 is an arm mounting plate which has a hollow support shaft 2 protruding at its front and is fixed to a cycle body such as a front fork with a bolt, said support shaft 2 having a female screw 3 provided from its front end into the hollowed portion.

4 is a cantilever type brake arm, which comes in a pair, at the lower end of which is a bossed section 5 to be pierced by the support shaft 2, at the middle of which is a brake shoe 6 attached in a position to face its counterpart, and at the top end of which is a lifting wire attaching element 7. At the front end of the bossed section 5 of said arm 4 is provided a shaft hole 10 to fit said arm onto the support shaft 2 via a bush 8 and a hollowed shaft section of a spring cap 9, and at its rear end is opened a return spring storage recess 11 to fit around the support shaft 2. A coil type return spring 12 is stored in said recess 11, the front edge 12A of said spring 12 being inserted and engaged onto a spring edge inserting hole 13 at the front side of said recess 11. The return spring 12 is wound in a different direction from its counterpart, the left spring counter-clockwise and the right spring clockwise.

Aforementioned spring cap 9 forms a hollowed and stepped shaft, wherein a stepped hole 14A is formed in a shaft hole 14 to be fitted onto the support shaft 2 and is made to fit onto a shoulder 2A of a larger diameter formed at the base of the support shaft 2, in such a manner that the tip of the front shaft 9A slightly protrudes from the front end of the support shaft 2, and said spring cap is firmly fixed onto the support shaft 2 by means of a mounting bolt 16 which is screwed into the female screw of the support shaft 2 via a washer 15. Also at the periphery of the spring cap 9 from its middle part to the rear are formed two shoulders of larger diameter, 9B, 9C; while the return spring 12 is positioned at the periphery of the large shoulder 9B closer to the shaft 9A, a spring inserting hole 18 is provided at a stepped surface 17 between the shoulders 9B and 9C into which is inserted another end 12B of the return spring 12. And the larger shoulder 9C of the spring cap 9 is fitted into the opening of the spring storage recess 11 on the bossed section 5 of the arm, so as to protect itself from invasion by water, sand and mud. Further, at the rear periphery of the cap is provided a hexagonal rotation tool seat 19 resembling a hexagonal nut for the purpose of spring tension adjustment.

The brake arm 4 is mounted onto the shaft 9A of the spring cap 9 via the bush 8 so as to be freely rotatable, and further onto the support shaft 2 so that the distance between brake shoes 6 on the right and the left can be freely broadened or narrowed.

In the first embodiment mentioned above, when the brake is operated, the paired brake arms 4 are rotated around support shafts 2 to press the paired brake shoes 6 against both sides of the wheel rim thus creating braking force. At this time, since the rear end 12B of the return spring 12 is fixed to the arm mounting plate 1 via the spring cap 9, its front end 12A is moved toward tightening direction by the brake arm 4, and when the brake is released, the force of the return spring 12 rotates the paired brake arm 4 in directions reverse from each other to spread apart their upper ends, thus separating brake shoes 6 from the rim to return to their original positions.

When tension adjustments are made of the return spring 12, a rotating tool such as a wrench is mounted onto the tool seat 19 of the spring cap 9; after the attaching bolt 16 is slightly loosened, the spring cap 9 is turned to tighten or unwind the return spring 12 and to adjust the spring tension; maintaining the tightened or unwound state of the spring, the attaching bolt 16 is tightened again to fix the spring cap 9 onto the support shaft 2. Thus, it is possible to not only adjust the tension of the return spring 12 but also to balance the adjustment of the paired brake arms 4, while the degree of adjustment can be visually ascertained from outside.

The second embodiment illustrated at FIGS. 3 and 4 differs from the first embodiment in that it has the return spring storage recess 11 opening at the front side of the bossed section 5' of the arm 4', and that the spring cap 9', not possessing a shaft, is mounted onto the support shaft 2 from the front side of the bossed section 5'. Therefore, the bossed section 5' of the brake arm 4' is directly mounted onto the support shaft 2 via the bush 8, so as to be freely rotatable, and the rear end surface of the spring cap 9' comes directly in contact with the tip of the support shaft 2, while the tightening bolt 16 is inserted into a bolt hole 20 provided instead of a shaft hole and screwed into the female screw 3 in the support shaft 2 to fix the spring cap 9' thereon. Since other parts of this second embodiment are almost similar in structure to the first embodiment, and also since the brake operation and spring tension adjustments are conducted in the similar manner as in the first embodiment, their descriptions are omitted; although the existence of differences has been reflected in the use of prime (') designations. In the second embodiment, the washer 15 used in the first embodiment may be omitted and the length of the spring cap 9' may be shortened.

Also, while the support shaft 2 in the first and second embodiments is formed in unity with the arm mounting plate 1, the support shaft 2 may be a separate part and can be connected to the mounting plate by means of a bolt or the like.

If grease oil is filled into the space formed between the return spring storage recess 11 on the brake arm 4 and the spring cap 9, this can effectively prevent rusting.

Further, the tool seat 19 on the spring cap 9 may be provided only on one side.

Embodiments shown above illustrate the tool seat 19 provided on both arms for the purpose of spring tension adjustment. However, said tool seat may be provided only on one of the arms.

Although the above embodiments describe the application in a cantilever type brake, naturally the present invention can also be applied to a center pull type caliper brake.

What is claimed is:

1. In a cycle brake consisting of a pair of brake arms provided with brake shoes, the distance between which can be freely widened or narrowed, arm mounting plates provided with supporting shafts to support brake arms and attached to a cycle body, return springs to energize brake arms constantly in spreading directions so as to separate the brake shoes from each other, and spring caps and tightening bolts; a cycle brake wherein a bossed section of at least one of the above brake arms forms a return spring storage recess surrounding the supporting shaft, a return spring being fitted onto the support shaft and stored within said recess, and said recess being directly closed by a respective one of said spring caps which releasably forced by a respective one of said tightening bolts into an axial abutment with an end portion of the supporting shaft which is sufficient to preclude relative rotation therebetween; wherein one end of the return spring is engaged onto the bossed section of each arm and the other end is engaged only in the spring cap; wherein a tool seat is formed by the periphery of the spring cap as a means for effectuating a spring tension adjustment upon relaxing of the force holding the spring cap in axial abutment with the supporting shaft by rotation of the spring cap relative to the supporting shaft; and wherein said bossed section is axially displaceable relative to said spring cap and supporting shaft when the spring cap is held in abutment with said supporting shaft; wherein the return spring storage recess has an opening at a rear side of the bossed section of the arm; wherein the spring cap has a shaft portion which is mounted onto the supporting shaft and passes from the rear of the bossed section to an end which protrudes at a front side of the bossed section; wherein the bossed section of the brake arm is indirectly mounted onto the supporting shaft so as to be freely rotatable; wherein the supporting shaft protrudes slightly at the front side of the bossed section; and wherein said bossed section is disposed with axial clearance between a washer of said tightening bolt and the periphery of said spring cap for enabling said axial displaceability of the boss section relative to the spring cap and supporting shaft.

* * * * *